C. V. TIERS.
COOKING UTENSIL.
APPLICATION FILED MAY 6, 1918.
1,299,267.
Patented Apr. 1, 1919.
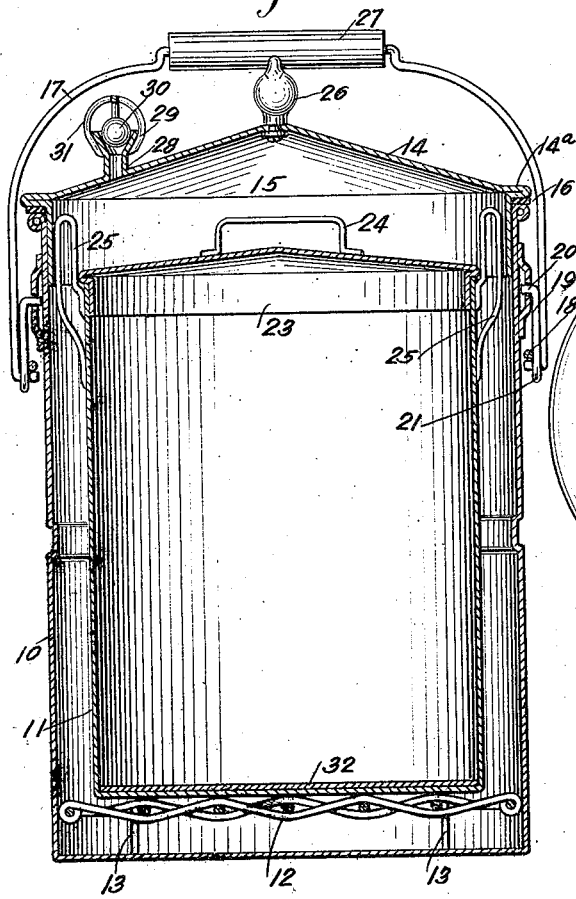
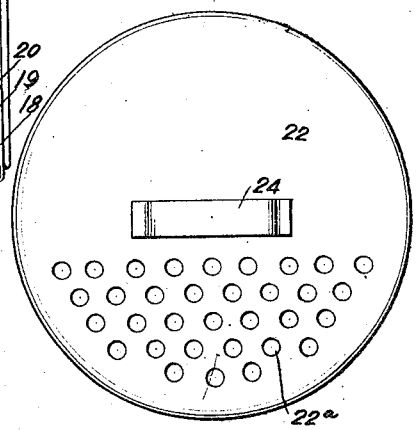
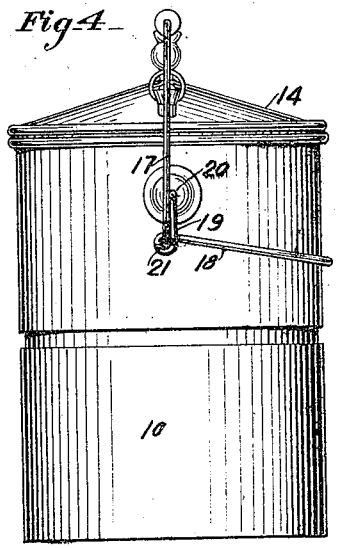
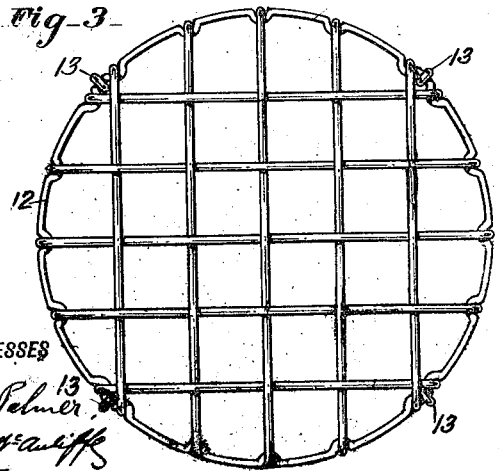
INVENTOR
Clarence V. Tiers
BY
ATTORNEYS
WITNESSES

UNITED STATES PATENT OFFICE.

CLARENCE V. TIERS, OF OAKMONT, PENNSYLVANIA.

COOKING UTENSIL.

1,299,267.   Specification of Letters Patent.   Patented Apr. 1, 1919.

Application filed May 6, 1918. Serial No. 232,818.

*To all whom it may concern:*

Be it known that I, CLARENCE VAN DYKE TIERS, a citizen of the United States, and a resident of Oakmont, in the county of Allegheny and State of Pennsylvania, have invented a new and Improved Cooking Utensil, of which the following is a full, clear, and exact description.

My invention relates to cooking utensils and more particularly to a cooking utensil adapted to be used as (1) a double boiler; (2) a steam cooker; (3) a canner or preserver; (4) a pudding cooker; or (5) as a cooker of vegetables, cereals, or the like.

My invention has for its object to provide a cooking utensil of the indicated character improved in various particulars, whereby certain advantages and results are obtained in a practical manner, among these being (1) the utensil may be used for steaming or cooking with assured success; (2) the economical use of water or steam characterizing the utensil makes it practical to leave the utensil on the fire, without attention, a long period without danger of the food being burned or dried out; (3) the utensil is readily convertible for ordinary cooking or for canning and preserving; (4) the outer vessel and inner receptacle are of a character to be used separately when desired; (5) the inner receptacle when employed with its individual cover in position may be conveniently lifted from the outer vessel and surplus water poured from the receptacle without removing the individual cover thereof; (6) the utensil lends itself advantageously to outdoor cooking where regularity of available heat and constant attention to the cooking are not to be counted upon; (7) the several elements are so coördinated as to effect a compact assemblage.

Reference is to be had to the accompanying drawings forming a part of this specification.

Figure 1 is a vertical section of a cooking utensil embodying my invention;

Fig. 2 is a plan view of the cover of the inner receptacle;

Fig. 3 is a plan view of the interior stand or false bottom on which the inner receptacle rests;

Fig. 4 is a side elevation of the utensil on a reduced scale, the view being taken at right angles to Fig. 1.

My improved utensil includes an outer vessel 10, of suitable size and shape, and an inner receptacle 11. The numeral 12 indicates a stand or false bottom supported on the bottom of the vessel 10 in any suitable manner as by legs 13, said stand being of woven wire or other material presenting openings through which boiling water may circulate and on which the receptacle 11 may be placed to elevate the same above the hot bottom of the vessel 10.

The vessel 10 has a cover 14 formed with a depending flange 15 to fit tightly within the vessel 10, said cover having a radial flange 14$^a$ above the vertical flange 15 to overlap the top of the vessel 10. A rubber gasket 16 may be employed between the flange 14$^a$ and the top of the vessel 10. The cover 14 is provided with a handle means which in the preferred form includes a bail 17 and a semi-circular clamping element 18 having cranked ends 19 pivoted at their inturned ends as at 20 to the sides of the vessel 10 and having a loop connection as at 21 with the lower ends of the bail 17, the arrangement being such that the clamp in the lowered position will draw the bail 17 and cover 14 tightly in position. Said bail 17 has preferably a loose sleeve 27 constituting a handhold which is adapted to bear on an upstanding member 26 provided centrally of the cover 14, whereby the sleeve 27 will act through the member 26 to hold the cover 14 tightly in position. The cover 14 is equipped with a safety valve for which purpose a steam outlet 28 in the cover is provided with a conical valve seat 29 on which a ball valve 30 is adapted to seat, said valve being inclosed within a cage 31 on the outlet 28.

The inner receptacle 11 is of a size to form an annular space between the same and the vessel 10 for circulation of steam or water. Also, the top of the receptacle 11 is spaced from the cover 14 to provide a steam space. A cover 22 is provided for the receptacle 11, a depending flange on said cover being snugly received in the upper end of said receptacle. A lift handle 24 of any desired form may be provided on the cover 22 and said cover is formed at one side of the center with a series of orifices 22$^a$, thereby establishing communication of steam between the interior of the receptacle 11 and the interior of the vessel 10. Also, said orifices 22$^a$ constitute means for pouring off from the receptacle surplus water from rice, vegetables, etc., without removing the cover 22. On the receptacle 11 at the exterior, near the top, handle means are provided, there being shown upstanding loops 25 in the illustrated form by which the receptacle can be lifted out of the vessel 10. Said handle means 25 constitutes also means to center the vessel 11, the flange 15 of the cover 14 being accommodated between said handle means and the interior of the vessel 10 at the top.

It will be seen that the vessel 10 and receptacle 11 are each of such form that either may be used separately, for cooking different articles when required, and also that the receptacle 11 may be removed and jars or the like placed directly on the stand 12 in canning or preserving. The cover 14 may be tightly clamped in place and the economical use of steam is such that the vessel may be permitted to remain on the fire for a long period without danger of the water becoming exhausted, thereby adapting the utensils to be placed on the stove by a person leaving the house in the morning to be absent all day. It will be obvious that the utensil readily adapts itself to use as a double-boiler or a steam cooker and that owing to there being no need for constant attention to be given the utensil, it lends itself especially well to outdoor cooking.

The inner receptacle 11 is serviceable as a pudding cooker, the purpose being increased by the provision of a separate disk 32 on the bottom thereof adapted to constitute a follower when the receptacle is inverted for dumping out the pudding.

Having thus described my invention, I claim as new and desire to secure by Letters Patent:

The device as herein characterized, including an outer vessel and a removable cover therefor having a downwardly depending annular flange adapted to fit within the upper end of the said vessel, a removable foraminous stand in said vessel and constituting a false bottom therefor, an inner food receptacle adapted to rest on said stand and presenting an annular space between the outer vessel and said food receptacle, a removable cover fitting within the upper end of the food receptacle, elongated resilient handles projecting from the sides of the upper end of the food receptacle at diametrically opposite points, said handles projecting above the cover of the food receptacle and bearing laterally against the inner face of the depending annular flange of the cover of the outer vessel, whereby the food receptacle is held centered within the outer vessel and the cover retained thereon, and whereby the food receptacle may be removed from the outer vessel by a single upward pull, and the hands protected from injury by heat from the food receptacle.

CLARENCE V. TIERS.